Figure 1:
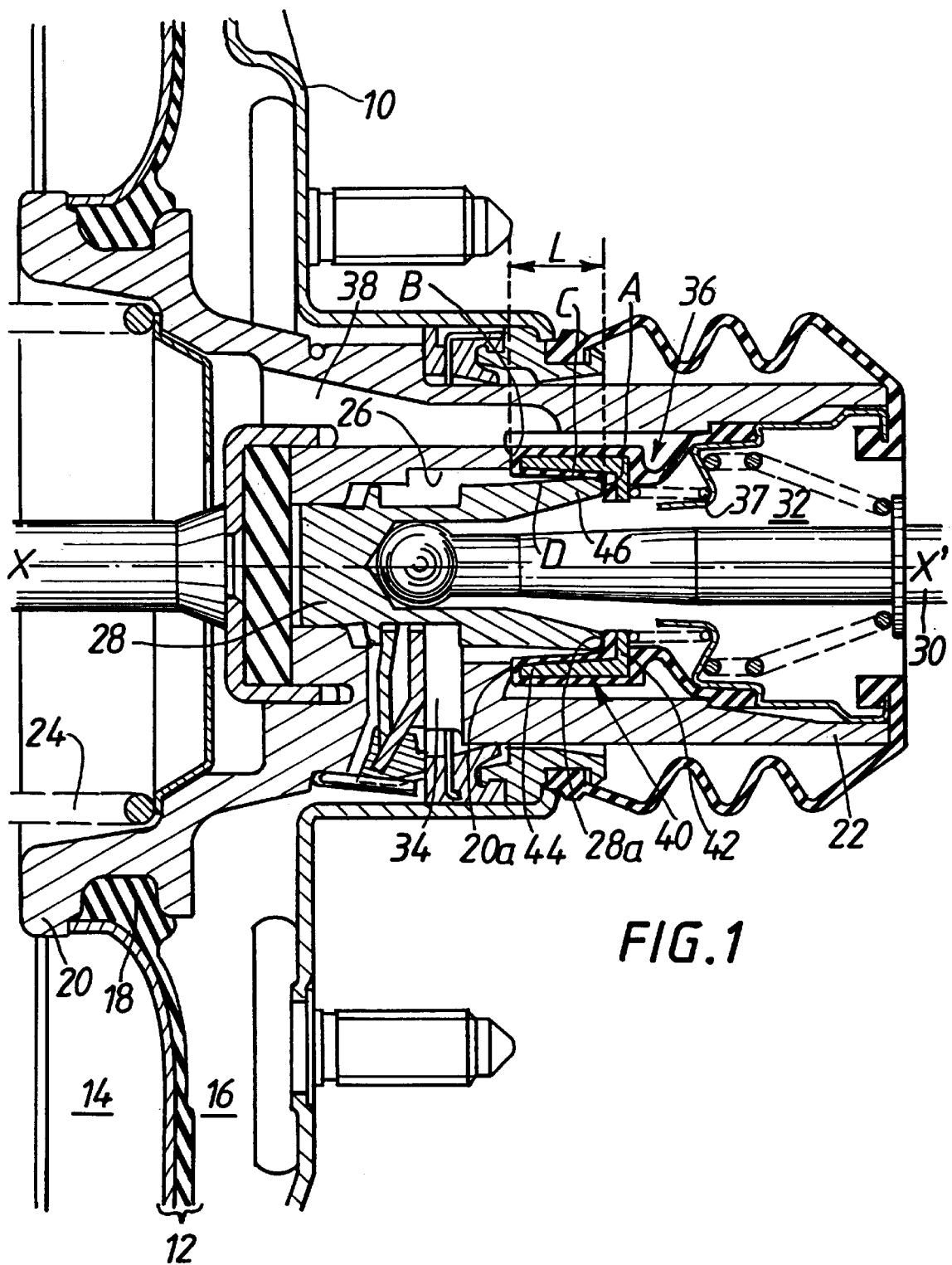

United States Patent

Schewe

[11] Patent Number: 5,878,646
[45] Date of Patent: Mar. 9, 1999

[54] SILENT PNEUMATIC BRAKE SERVO

[75] Inventor: Jorg Schewe, Paris, France

[73] Assignee: Bosch Systems de Freinage, Drancy, France

[21] Appl. No.: 535,105
[22] PCT Filed: Oct. 12, 1995
[86] PCT No.: PCT/FR95/01329
 § 371 Date: Nov. 13, 1995
 § 102(e) Date: Nov. 13, 1995
[87] PCT Pub. No.: WO96/17758
 PCT Pub. Date: Jun. 13, 1996

[30] Foreign Application Priority Data

Dec. 9, 1994 [FR] France .................................. 94 14809

[51] Int. Cl.⁶ .................................................. F15B 9/10
[52] U.S. Cl. ............................................... 91/376 R
[58] Field of Search ............................. 91/369.1, 369.2, 91/376 R

[56] References Cited

U.S. PATENT DOCUMENTS

| 4,005,638 | 2/1977 | Takeuchi | 91/376 R X |
| 4,643,075 | 2/1987 | Wagner | 91/376 R X |
| 4,729,288 | 3/1988 | Thioux | 91/376 R |
| 5,263,399 | 11/1993 | Flory et al. | 91/376 R |

FOREIGN PATENT DOCUMENTS

| 8704366 | 7/1987 | Germany . |
| 3900416 | 7/1990 | Germany . |
| 3923843 | 1/1991 | Germany . |
| 4014560 | 11/1991 | Germany . |

Primary Examiner—Hoang Nguyen
Attorney, Agent, or Firm—Leo H. McCormick, Jr.; Warren Comstock

[57] ABSTRACT

A pneumatic brake booster having a casing (10) with an axis of symmetry (X-X') and divided in leaktight fashion by a movable wall structure (12,20) into a front chamber (14) and a rear chamber (16). The front chamber (12,20) is permanently connected to a source of partial vacuum while the rear chamber (16) is connected selectively to the front chamber (14) or to the outside atmosphere by a three-way valve (36). The three-way valve is actuated by a plunger (28) which slides in a bore (26) of the movable wall (12, 20) in response ton an input applied to an axial control rod (30). The three-way valve (36) is located in a rear tubular part (22) of the movable wall structure (12, 20) which projects outside of the casing (10) and including a valve element (36). Valve element (36) interacts via a first annular surface (A) with a first valve seat (28a) formed on the plunger (28) and via a second annular surface (B) with a second valve seat (20a) formed on the movable wall (20). The second annular surface (B) is situated in a first transverse plane located forward of a second transverse plane in which the first annular surface (A) is situated. The first (A) and second (B) annular surfaces are joined together by a surface (C;C1,C2) of the valve element (36) facing a surface (D) of the plunger (28). The first annular surface (A) and the surface (C; C1, C2) of the valve element (36) defining, together with the first valve seat (28a) formed on the plunger (28), a valve passage (28a, 36). The valve passage (28a, 36) has a cross-section(s) defined by a non-linear function of the distance (d) between the first valve seat (28a) and the first annular surface (A).

8 Claims, 3 Drawing Sheets

SILENT PNEUMATIC BRAKE SERVO

The present invention relates to pneumatic boosters of the type of those used to boost the braking in motor vehicles.

Such boosters conventionally include a casing having an axis of symmetry, divided in leaktight fashion by a movable wall structure into a front chamber permanently connected to a source of partial vacuum, and a rear chamber connected selectively to the front chamber or to the outside atmosphere by a three-way valve actuated by a plunger sliding in a bore of the moving wall and secured to an axial control rod, the three-way valve being located in a rear tubular part of the moving wall structure projecting outside of the casing and including a valve element interacting via a first annular surface with a first valve seat formed on the plunger and via a second annular surface with a second valve seat formed on the moving wall.

These boosters are usually located in the engine compartment of the vehicle, on its bulkhead, so that the rod for controlling the booster projects into the passenger compartment so that it can be actuated by the driver. It follows that the rear central part of the movable wall, including the three-way valve, also projects into the passenger compartment.

As a result, when the driver actuates the brake pedal connected to the control rod of the booster, the latter sucks air at atmospheric pressure in from the passenger compartment of the vehicle. The air set in motion by the operation of the booster therefore generates noises which are wholly transmitted into the passenger compartment of the vehicle.

Attempts have been made to provide various solutions to this problem. For example, document FR-A-2,551,009 provides means for guiding the air in the immediate surroundings of the three-way valve, upstream and downstream of the latter.

Document FR-A-2,516,880 provides a silencer device made from crosslinked foam, located inside the rear central part of the movable wall structure, this device including an outer surface applied against the inner surface of this rear central part, and the inside of which is formed with uninterrupted passage openings pointing in the direction of the control rod to give a passage for the flow of air through the device.

Document DE-A-3,924,672 for its part provides a booster in which the intake for air at atmospheric pressure is situated in the engine compartment of the vehicle.

However, these prior solutions still present devices which are imperfect, or economically inapplicable because they are too complicated. What is more, for the purpose of reducing the operating noise, these systems introduce into the path of the air, obstacles to its movement which increase the response time of the booster at the beginning of its actuation phase.

The object of the present invention is therefore to propose a booster the operation of which is silent, implementing means which are simple, reliable and inexpensive, and which do not adversely influence the response time of the booster.

To this end, the invention provides a booster of the type recalled above, in which the second annular surface is situated in a transverse plane forwards of the transverse plane in which the first annular surface is situated, the first and second annular surfaces being joined together by a surface of the valve element situated facing a surface of the plunger, the first annular surface and the surface of the valve element defining, together with the first valve seat formed on the plunger, a valve passage, the cross-section(s) of which is a non-linear function of the distance between the first valve seat and the first annular surface lower than or equal to the linear function of this distance.

According to preferred embodiments, the surface of the valve element is cylindrical or frustoconical and defines, together with the valve seat formed on the plunger, a valve passage, the cross-section of which is constant or substantially constant for any value of the distance between the first valve seat and the first annular surface.

Thus, since the passage cross-section offered to the air towards the rear chamber of the booster is at least substantially constant, the flow rate of air passing through the valve passage is itself also at least substantially constant, so that the noise generated by the moving air can be maintained to a substantially constant level, which can be chosen to be quite low.

Figure 2:
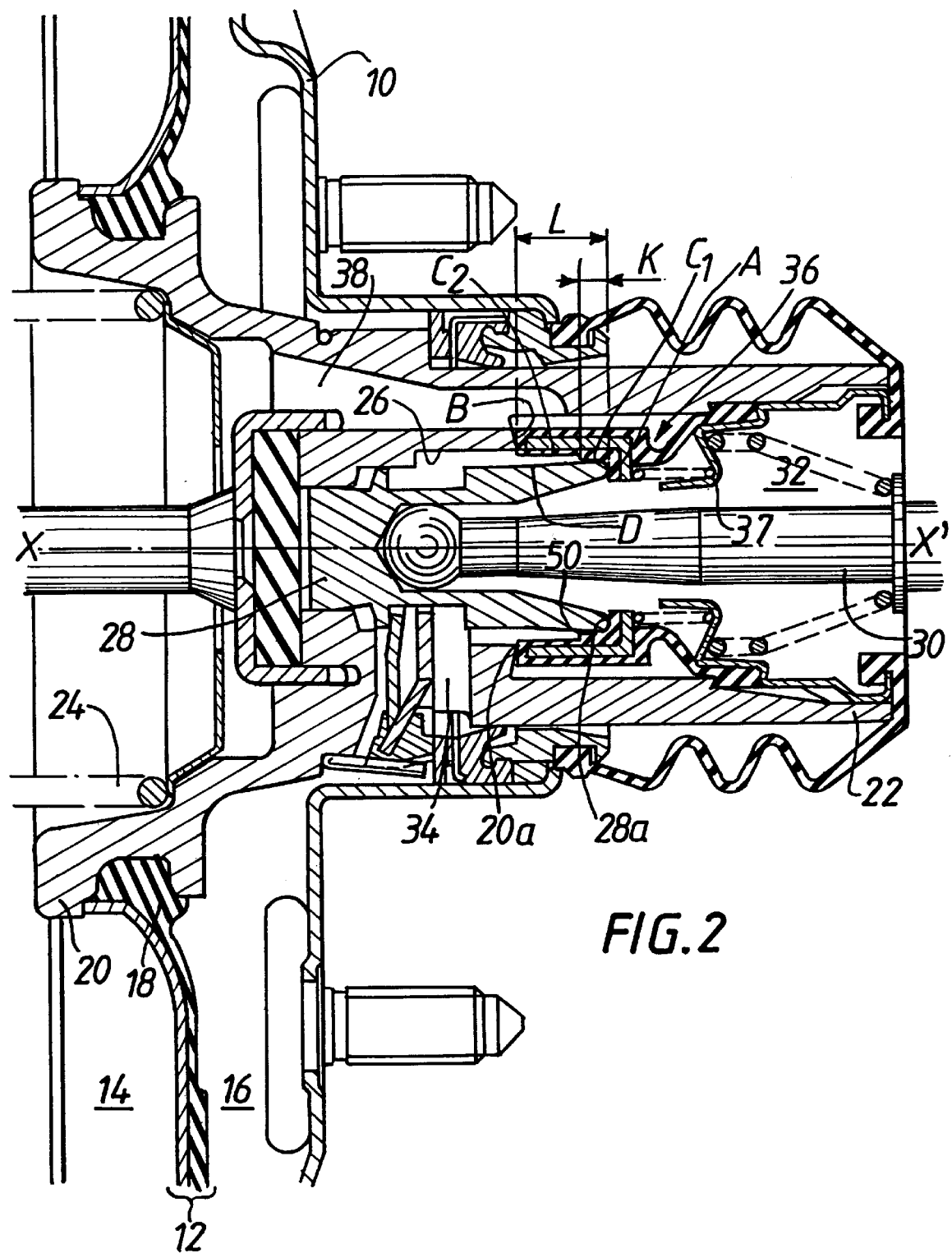
Figure 3:
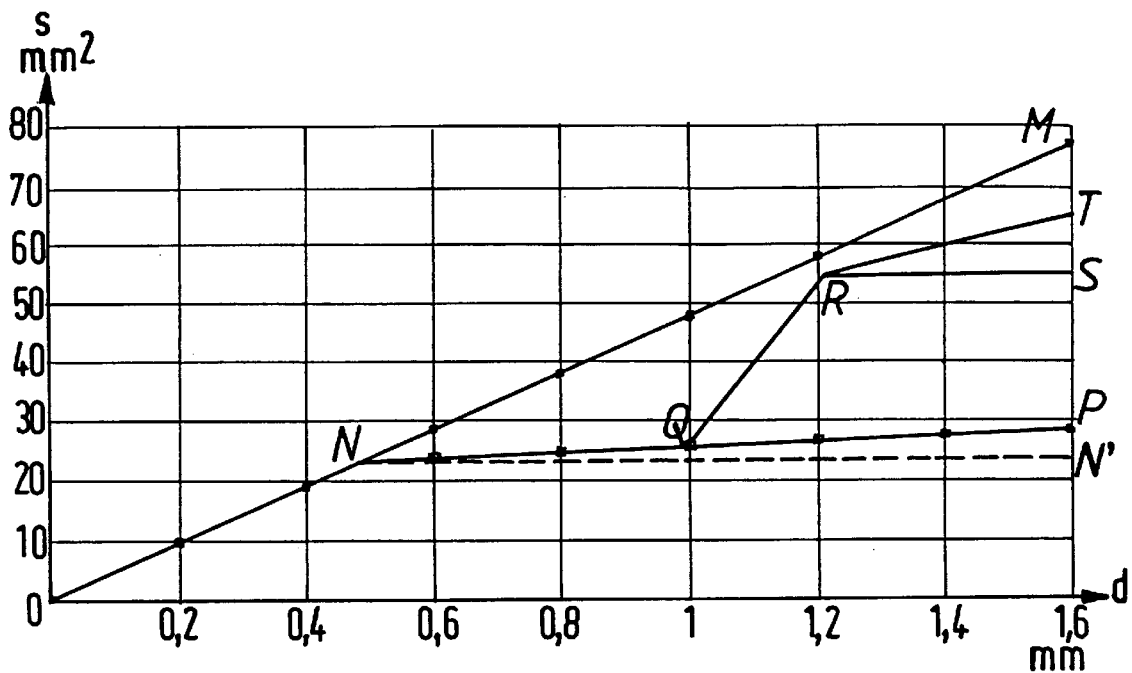
Figure 4:
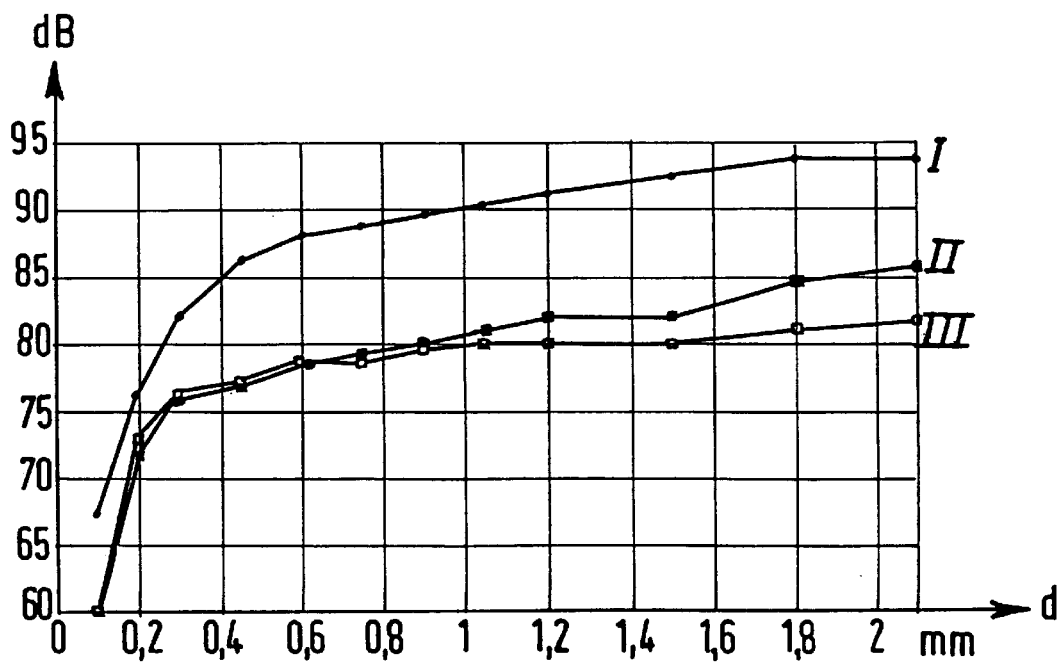

Other objects, characteristics and advantages of the present invention will emerge more clearly from the description which follows of one embodiment given by way of illustration with reference to the appended drawings in which:

FIG. 1 is a side view, in longitudinal section, representing the rear central part of a pneumatic brake booster, produced in accordance with the present invention, FIG. 2 is a view similar to that of FIG. 1, of a first embodiment variant, FIG. 3 is a curve giving the passage cross-section of the valve of the booster represented in FIGS. 1 and 2 as a function of the relative axial position of the plunger and of the valve element, and FIG. 4 is a curve giving the noise level, expressed in decibels, of a booster produced in accordance with the invention, and of a conventional booster.

The figures represent the rear central part of a pneumatic brake booster designed to be placed in the usual way between the brake pedal of a vehicle and the master cylinder controlling the hydraulic braking circuit of this vehicle. By convention, that part of the booster which points towards the master cylinder is termed the "front", and that part of the booster which points towards the brake pedal is termed the "rear". In the figures, the front is thus to the left and the rear to the right.

The booster represented comprises an outer casing 10 in the form of a shell, exhibiting a symmetry of revolution about an axis X-X'. Only the rear central part of this casing 10 is represented in the figures.

A movable wall structure 12 delimits a front chamber 14 and a rear chamber 16 inside the casing 10. The movable wall 12 is associated with a flexible rolling seal of elastomer, the internal peripheral edge of which is received in a leaktight fashion by virtue of a bead 18 in a hollow boost piston 20 located along the axis X-X' of the booster, and the external peripheral edge (not represented) of which is fixed in leaktight fashion to the external casing 10.

The hollow piston 20 extends to the rear in the form of a tubular part 22 which passes in leaktight fashion through the rear wall of the casing 10. A compression spring 24 interposed between the piston 20 and the front wall (not represented) of the casing 10 normally holds the piston 20 in the rear rest position illustrated in the figures, in which position the rear chamber 16 has its minimum volume and the front chamber 14 has its maximum volume.

In the central part of the movable wall situated in front of the rear tubular part 22, the piston 20 exhibits a bore 26 in which is slidingly received a plunger 28 which also exhibits a symmetry of revolution about the axis X-X'. The front end of a rod 30 controlling the booster, which rod is also located along the axis X-X', is mounted so that it can swivel in a blind bore of the plunger 28.

The rear end (not represented) of the control rod 30, which projects outside the tubular part 22, is controlled directly by the brake pedal (not represented) of the vehicle.

The annular space 32 between the rear tubular part 22 and control rod 30 can communicate with the rear chamber 16 through a radial passage 34 formed in the central part of the piston 20, when boost means, controlled by the plunger 28, are actuated.

Conventionally, these boost means comprise a three-way valve including an annular valve element 36 and two annular valve seats 20*a* and 28*a* formed respectively at the rear of the central part of the piston 20 and at the rear of the plunger 28, a valve spring 37 urging the valve 36 towards the seats 20*a* and 28*a*.

When the control rod 30 is in the rear position of rest, the three-way valve normally establishes a communication between the two chambers 14 and 16 of the booster via the radial passage 34 and a substantially axial passage 38 formed in the central part of the piston 20, the valve seat 20*a* being slightly separated from the annular valve element 36.

In a conventional design of a three-way valve, as illustrated for example in one of the abovementioned documents, when the driver presses on the brake pedal, the air in the annular space 32 is sucked into the rear chamber 16 via the valve passage 28*a*–36 between the valve element 36 and the valve seat 28*a*, formed on the plunger 28.

In this known design, the passage cross-sections for the air is directly proportional to the axial distance d between the valve seat 28*a* and the frontal annular surface of the valve element 36. This passage cross-section is represented, for example, by the straight line OM in FIG. 3, as a function of the distance d. It follows that the air flow rate, itself a linear function of the cross-section, is directly proportional to this distance d, and that the noise due to this moving air itself also increases with the distance d.

The object of the present invention is precisely to reduce the noise generated by the three-way valve, by intending to master the air flow rate in order to limit the resulting noise.

In accordance with the present invention, the part of the valve element which points forwards includes a first planar annular surface A interacting with the valve seat 28*a* formed on the plunger 28, and a second planar annular surface B interacting with the valve seat 20*a* formed on the piston 20, the annular surface B being formed in a transverse plane situated forwards of the transverse plane containing the annular surface A and having an inside diameter which is greater than the outside diameter of the surface A. These two surfaces A and B are joined together by a third surface C, of frustoconical overall shape, and are separated by the axial distance L.

In the example represented, the valve element 36 is formed with the aid of an insert 40 including an annular rear part 42 and a cylindrical front part 44, the elastomeric substance forming the valve element 36 being overmoulded onto this insert so that the two surfaces A and B have the same elasticity in their interaction with the valve seats 20*a* and 28*a*, and so that the surface C is joined to the surface A via a rounded intermediate surface, as has been shown.

At the same time, the valve seat 28*a* is formed at the rear end of the plunger 28, and more precisely at the end of a rear tubular part 46 of the plunger, surrounding the control rod 30, and the external peripheral surface D of which is, at rest, opposite the surface C of the valve element 36 over the length L. The surface D of the part 46 could be cylindrical or, as has been represented, frustoconical, with a small half-angle at the vertex, one lying, for example, between 0 and 20 degrees.

The operation of the three-way valve of the invention will have been understood from the foregoing explanations.

When the driver of the vehicle actuates the brake pedal, this results in a forwards movement of the control rod 30, of the plunger 28 and of the valve element 36, the annular surface B of which first of all comes into contact with the valve seat 20*a* in order to isolate the chambers 14 and 16 from one another. Next, the valve seat 28*a* starts to move away from the annular surface A in order to allow the air at atmospheric pressure in the annular space 32 to enter the rear chamber 16 via the radial passage 34.

In a first phase of the movement of the plunger 28 relative to the valve element 36, only the axial distance between the valve seat 28*a* and the surface A determines the magnitudes of the passage cross-section offered to the moving air. This first phase is represented by the segment ON in the curve of FIG. 3, which is, of course, on the straight line OM.

When the axial distance between the seat 28*a* and the surface A has reached a certain magnitude, determined in particular by the radius of curvature of the seat 28*a* and that of the rounded surface of the valve element 36 joining the surfaces A and C together, the magnitude of the passage cross-section for the air is then determined by the radial distance between the seat 28*a* and the surface C of the valve element.

If the surface C is cylindrical, the passage cross-section will then be constant and will maintain the magnitude N reached at the end of the previous operating phase for any value of the distance d between the seat 28*a* and the surface A, less than the length L. The change in passage cross-section in this second operating phase of the booster by a segment NN' (FIG. 3) parallel to the abscissa axis [sic]. The air flow rate towards the rear chamber 16 of the booster will then be constant, as will be the noise generated by the moving air.

If, as has been represented, the surface C is frustoconical, then the passage cross-section of the air will change as a function of the magnitude of the half-angle of the vertex of the surface C. For small values of this half-angle, for example of between 0 and 20 degrees, the change in passage cross-section in this second operating phase of the booster is relatively slow and can be represented by the segment NP on the curve in FIG. 3, the slope of this segment NP being gentle, and a direct function of the angle of the surface C.

As a result, the flow rate of air towards the rear chamber 16 of the booster remains substantially constant while the plunger 28 is moving in the bore 26, and so does the noise generated by the air thus set in motion.

This is indeed what is found experimentally, as can be seen in the curves of FIG. 4, which give the result of the noise level measurement of a booster as a function of the axial distance d between the valve seat 28*a* and the surface A. The curve I corresponds to a conventional booster, the operation of which is illustrated by the straight line OM in FIG. 3. Curves II and III correspond to two boosters equipped with a valve element 36 and with a plunger 28 which are in accordance with the present invention, each having a particular value of the half-angle of the vertex of the frustoconical surface C, all the other parameters and measurement conditions obviously being identical for the three curves.

In particular, it can be seen in FIG. 4 that, for the second operating phase of the booster corresponding to the segment NP of FIG. 3, that is to say for a distance d greater than approximately 0.3 millimeters, the noise level of boosters produced in accordance with the present invention is 10 to 15 decibels less than that of a conventional booster, and throughout the entire second operating phase, which corresponds to a very substantial decrease in the noise level.

It can also be seen in FIG. 4 that the noise level of the boosters II and III is less than that of the conventional booster I even during the first operating phase, corresponding to the segment ON of FIG. 3. This phenomenon can be explained by the fact that the moving air is guided as soon as it leaves the valve passage 28a-A by the rounded surface joining the surfaces A and C together, and thus does not abruptly hit the wall of the bore 26 as it does in a conventional booster, which creates turbulence generating, in combination with the gap of the valve passage, whistling noises which are thus avoided by the present invention, giving some sort of throttling of the moving air.

Such an improvement in the operating noise is furthermore obtained without any increase in the response time of the booster, and an improvement in this response time is even noted. Indeed, according to the invention, the flow of air penetrating into the rear chamber is improved by the specific shape of the valve element 36 and of the plunger 28. As, what is more, the outflow cross-section downstream of the three-way valve in a transverse plane between the plunger 28 and the bore 26 is constant if the surface D is cylindrical, or slightly divergent if the surface D is frustoconical with a small half-angle at the vertex, the air flow rate is also improved, and the response time decreased. The half-angle at the vertex of the surface D could, for example, be selected to be between 0 and 20 degrees.

FIG. 2 represents an alternative to the embodiment which has just been described, in which the same elements are assigned the same reference signs. According to this variant embodiment, just the valve element 36 has been modified by comparison with the previous embodiment.

More precisely, the internal surface of the front cylindrical part of the valve element 36 is formed with a radial shoulder 50, thus delimiting two surfaces $C_1$ and $C_2$. The surface $C_1$ extending between the annular surface A and the shoulder 50 has the same characteristics as the surface C of the previous example, but it has an axial length K less than the length L of the surface C. The surface $C_2$ extending between the shoulder 50 and the annular surface B is cylindrical in the example represented, and it has a diameter markedly greater than the diameter of the front end of the surface $C_1$. The surface $C_2$ could equally well be frustoconical, so as to form, together with the surface D, a volume which diverges forwards.

The operation of the booster of FIG. 2 can be deduced from the preceding explanations. The first phase of the movement of the plunger 28 relative to the valve element 36 is represented by the segment ON in FIG. 3, the distance between the seat 28a and the surface A assuming, like in the embodiment of FIG. 1, a dominant role in this operating phase.

Since the surface $C_1$ is identical to the rear part of the surface C, the second operating phase of the booster of FIG. 2 is identical to that of the booster of FIG. 1 except that, when the valve seat 28a gets close to the shoulder 50, that is to say after it has covered the distance K, there is an abrupt increase in the passage cross-section, corresponding to the increase in the distance between the seat 28a and the surfaces $C_1$ and $C_2$.

This abrupt increase in the cross-section corresponds to a third operating phase of the booster, which is represented in FIG. 3 by the segment QR. Then, in a fourth operating phase, the seat 28a comes opposite the cylindrical surface $C_2$, the passage cross-section thus remains constant and is represented by the segment RS in FIG. 3. If the surface $C_2$ has been produced with a frustoconical shape, then the passage cross-section in this fourth phase will also be increasing, and represented by a segment such as RT in FIG. 3.

The advantage of such an arrangement with surfaces $C_1$ and $C_2$ is that the length K can be selected so that the first two operating phases (segments ON and NQ in FIG. 3) correspond to the vast majority of braking actions, and where the driver wishes simply to slow his vehicle down or bring it to rest under conditions which can be counted as normal.

In contrast, the driver of the vehicle may encounter unforeseen situations where it is necessary to slow the vehicle down sharply and rapidly. In such a situation of emergency braking where the driver of the vehicle, let us assume, exerts a forceful action on the brake pedal, the plunger 28 is pushed hard into the bore 26 so that the seat 28a is brought to face the surface C2 right at the beginning of the braking action.

The booster is then immediately placed in the fourth operating phase described above, and corresponding to the segment RS of FIG. 3, the first three phases having been covered very rapidly. In this phase, it can be seen from FIG. 3 that the passage cross-section offered to the moving air is markedly greater than that of the booster in FIG. 1, and thus that the air flow rate towards the rear chamber 16 of the booster will also be greater.

The boosting provided by the booster of FIG. 2 under these conditions of operation is therefore greater more rapidly than via the booster of FIG. 1. The operating noise of the booster of FIG. 2 is, of course, greater than that of the booster of FIG. 1 but only in the case of emergency braking which represents less than 1% of all braking actions. For this purpose, a magnitude can be selected for the axial length K of the surface $C_1$ which satisfies this condition, it being possible for this magnitude to be between 0.3 and 2 millimeters depending on the type of booster.

It can therefore clearly be seen that a booster, the operation of which is silent, has been achieved by modifying, by comparison with known boosters, only the plunger and the valve element, all the other components remaining unchanged. The means used to reach this objective are therefore particularly simple, reliable and inexpensive, and furthermore do not adversely affect the response time of the booster.

The invention thus gives the expert parameters, such as the half-angles at the vertex of the conical surfaces C, D, $C_1$ or $C_2$, the radii of curvature of the valve seat 28a or of the rounded surface between the surfaces A and C or $C_2$, the lengths L and K which he can alter, depending on the characteristics of a given booster, such as its dimensions, its shape or the nature of the materials forming it, in order to obtain the desired result, that is to say minimum operating noise.

Of course the invention is not limited to the embodiments which have been described but can in contrast receive numerous modifications which will be obvious to the expert and which fall within the scope of the appended claims.

I claim:

1. A pneumatic brake booster, including a casing with an axis of symmetry, said casing being divided in leaktight fashion by a movable wall structure into a front chamber permanently connected to a source of partial vacuum and a rear chamber connected selectively to said front chamber or to the outside atmosphere by a three-way valve, said three-way valve being actuated by a plunger sliding in a bore of said movable wall and secured to an axial control rod, said three-way valve being located in a rear tubular part of said movable wall structure which projects outside of said casing, said three-way valve structure having a valve element which interacts via a first annular surface with a first valve seat formed on said plunger and via a second annular surface with a second valve seat formed on said movable wall, characterized in that said second annular surface is situated in a first transverse plane forwards of a second transverse plane in which said first annular surface is situated, said first and second annular surfaces being joined together by a surface of said valve element situated facing a surface of said plunger, said first annular surface and said surface of the valve element defining, together with said first valve seat formed on the plunger, a valve passage, having a cross-section which is a non-linear function of a distance between said first valve seat and said first annular surface lower than or equal to a linear function of said distance.

2. The brake booster according to claim 1, characterized in that said surface of said valve element is cylindrical and defines, together with said valve seat formed on said plunger, said valve passage, a cross-section of which is constant for any value of a distance between said first valve seat and said first annular surface.

3. The brake booster according to claim 1, characterized in that said surface of said valve element is frustoconical and defines, together with said valve seat formed on said plunger, said valve passage, a cross-section of which is substantially constant when a distance between said first valve seat and said first annular surface varies.

4. The brake booster according to claim 1, characterized in that said surface of said valve element is formed of two surfaces separated by a radial shoulder, a first surface defining, together with said first valve seat said valve passage, a cross-section of which is a first function of a distance between said first valve seat and said first annular surface and a second surface defining, together with said first valve seat a second valve passage, said second valve passage having a cross-section defined by a second function of a distance between said first valve seat and said first annular surface.

5. The brake booster according to claim 1, characterized in that said first surface of said valve element has a frustoconical shape and defines, together with said valve seat formed on said plunger said valve passage, a cross-section of which is equal to a first substantially constant value when a distance between said first valve seat and said first annular surface varies, and in that a second surface of said valve element has a frustoconical shape and defines, together with said valve seat formed on said plunger a second valve passage, said second valve passage having a cross-section which is equal to a second substantially constant value when a distance between said first valve seat and said first annular surface varies, said second valve passage being greater than said first valve passage.

6. The brake booster according to claim 1, characterized in that said surface of said plunger which faces said surface is frustoconical and forms, together with said surface, a volume which diverges forward.

7. The brake booster according to claim 6, characterized in that a half-angle at the vertex of said frustoconical surfaces is between 0 and 20 degrees.

8. The brake booster according to claim 1, characterized in that an axial length of said first surface of said valve element is between 0.3 and 2 millimeters.

* * * * *